United States Patent
Trimberger et al.

(10) Patent No.: US 6,748,368 B1
(45) Date of Patent: Jun. 8, 2004

(54) PROPRIETARY CORE PERMISSION STRUCTURE AND METHOD

(75) Inventors: Stephen M. Trimberger, San Jose, CA (US); William S. Carter, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/477,650

(22) Filed: Jan. 5, 2000

(51) Int. Cl.[7] .................. H03K 19/177; G06F 17/00
(52) U.S. Cl. .................. 705/500; 326/37; 326/38; 326/39; 326/40; 326/8; 326/41; 711/165; 711/163
(58) Field of Search .................. 705/51, 57; 713/200, 713/201; 380/3, 4, 23, 25; 711/101, 163, 165; 710/200; 326/8, 37–41

(56) References Cited

U.S. PATENT DOCUMENTS

| | | | |
|---|---|---|---|
| 5,838,901 A | * 11/1998 | Curd et al. | 326/41 |
| 5,991,880 A | * 11/1999 | Curd et al. | 713/200 |
| 6,086,631 A | * 7/2000 | Chaudhary et al. | 716/16 |
| 6,094,064 A | * 7/2000 | Mejia et al. | 326/39 |
| 6,289,455 B1 | * 9/2001 | Kocher et al. | 713/194 |
| 6,310,956 B1 | * 10/2001 | Morito et al. | 380/201 |
| 6,331,790 B1 | * 12/2001 | Or-Bach et al. | 326/41 |
| 6,525,557 B1 | * 2/2003 | Mcmanus et al. | 326/8 |

OTHER PUBLICATIONS

PLDs with processor cores enable browsable, configurable devices, Hoyer, B; Barrios, I; International IC—Taipei Conference Proceedings, 1998.*

CPU cores enable browsable PLDs, Hoyer, Bryan, Electronic Engineering Times, 96, Jul. 10, 2000.*

* cited by examiner

*Primary Examiner*—James P. Trammell
*Assistant Examiner*—C Owen Sherr
(74) *Attorney, Agent, or Firm*—Adam H. Tachner; Jeanette S. Harms; Lois D. Cartier

(57) ABSTRACT

A programmable logic device includes a non-volatile permission memory block to enable a customer to utilize a proprietary core. In one embodiment, the core supplier designs its core to check for a specified permission bit or bit pattern in the permission memory block before the core will operate. If the permission bit or bit pattern is set properly, the core functions correctly when implemented in the PLD. If not, the core will not function. To prevent the customer from modifying the core such that it no longer depends upon the permission bits to function, the configuration bitstream used to program the PLD can be encrypted before and during transmission to the PLD. This encryption ensures security of the customer's logic design as well as the supplier's core design. In this manner, the customer remains dependent upon properly set permission memory bits, i.e. proper authorization, to obtain core functionality.

18 Claims, 4 Drawing Sheets

PROPRIETARY CORE PERMISSION STRUCTURE AND METHOD

CROSS-REFERENCE TO RELATED APPLICATIONS

This application is related to U.S. patent application Ser. No. 09/038,800 to Kelem et. al., entitled "SYSTEM AND METHOD FOR PLD BITSTREAM ENCRYPTION," filed Mar. 11, 1998 and issued Sept. 12, 2000 as U.S. Pat. No. 6,118,869, which is incorporated herein by reference.

FIELD OF THE INVENTION

The present invention relates generally to distributing an integrated circuit core, and more particularly to a method of ensuring that a core designed by a core supplier will be used only by an authorized party, and by such an authorized party only an authorized number of times.

BACKGROUND OF THE INVENTION

In recent years, constant innovation in silicon process technology has drastically reduced the price and increased the performance and functionality of integrated circuit devices. With these improvements come increasing demands on the integrated circuit design system developers for still faster and cheaper devices. As a result, electronic system design is now moving to a methodology known in the art as "system on a chip" in which a system is designed by integrating a plurality of existing "cores" obtained, purchased, or licensed from various suppliers.

Cores are defined as any reproducible circuit description, often referred to in the industry as logic cores or circuit cores. The term "core" as used herein is intended to cover all such definitions. In general, there are three types of cores: soft, firm, and hard. Hard cores are functions with mask layout data for the physical layout information. Firm cores are machine-readable netlists that are ready for place and route. Soft cores are available as synthesizable, encryptable files which allow the customer to optimize the core for the intended function.

The core suppliers would like to license their cores to as many customers as possible. However, suppliers are currently unable to easily monitor the number of times a licensed core is used and, therefore, whether the appropriate license fee has been paid by the customer. Moreover, suppliers cannot monitor whether only authorized parties have obtained copies of the core, or whether the core has been modified without permission.

One solution to these problems is for a supplier to directly police a customer's fabrication facility, whether within the customer's business or out-sourced. However, most customers do not want a core supplier to be able to interfere with manufacturing, even for license monitoring, particularly when manufacturing is out-sourced. Thus, a more efficient and customer-acceptable policing method is needed.

Programmable logic devices (PLDs), such as the field programmable gate array (FPGA) or the complex programmable logic device (CPLD), provide an especially convenient vehicle for integrating cores (particularly firm or soft cores) into user designs. PLDs, as described and claimed in numerous patents assigned to Xilinx, Inc., assignee of the present invention, allow a customer to configure (and reconfigure) the programmable elements on the PLD to implement various logic functions. Because of this versatility, the cores implemented on a PLD can be updated as improvements in functionality, and efficiency occur without requiring new silicon. Specifically, a PLD can simply be reconfigured with the improved design, instead of designing a new device. However, currently, the use of PLDs does not address the challenge of how to police and account for proper licensing of cores.

SUMMARY OF THE INVENTION

To address the shortcomings of the prior art, the present invention provides a PLD including a non-volatile permission memory block to enable a customer to utilize the core. In one embodiment, the core supplier designs its core to check for a specified permission bit or bit pattern in the permission memory block before the core will operate. If the permission bit or bit pattern is set properly, the core functions correctly when implemented in the PLD. If not, the core will not function.

To control the number of copies the customer can implement, the core supplier instructs the PLD manufacturer to give the customer a predetermined number of devices with the permission memory block set for the supplier's core. The manufacturer then sets the permission bits appropriately, and ships the devices to the customer. Because the supplier's core will only function if the device contains the appropriate permission bits, the supplier can be confident that the customer cannot make or use more copies than the number of appropriately set devices received from the manufacturer Thus, the supplier need not visit the customer to count the number of copies being made by the customer.

To prevent the customer from modifying the core such that it no longer depends upon the permission bits to function, the configuration bitstream used to program they PLD can be encrypted before and during transmission to the PLD. This encryption ensures security of the customer's logic design as well as the supplier's core design In this manner, the customer remains dependent upon properly set permission memory bits, i.e. proper permission, to obtain core functionality.

DETAILED DESCRIPTION OF THE DRAWINGS

Figure 1:
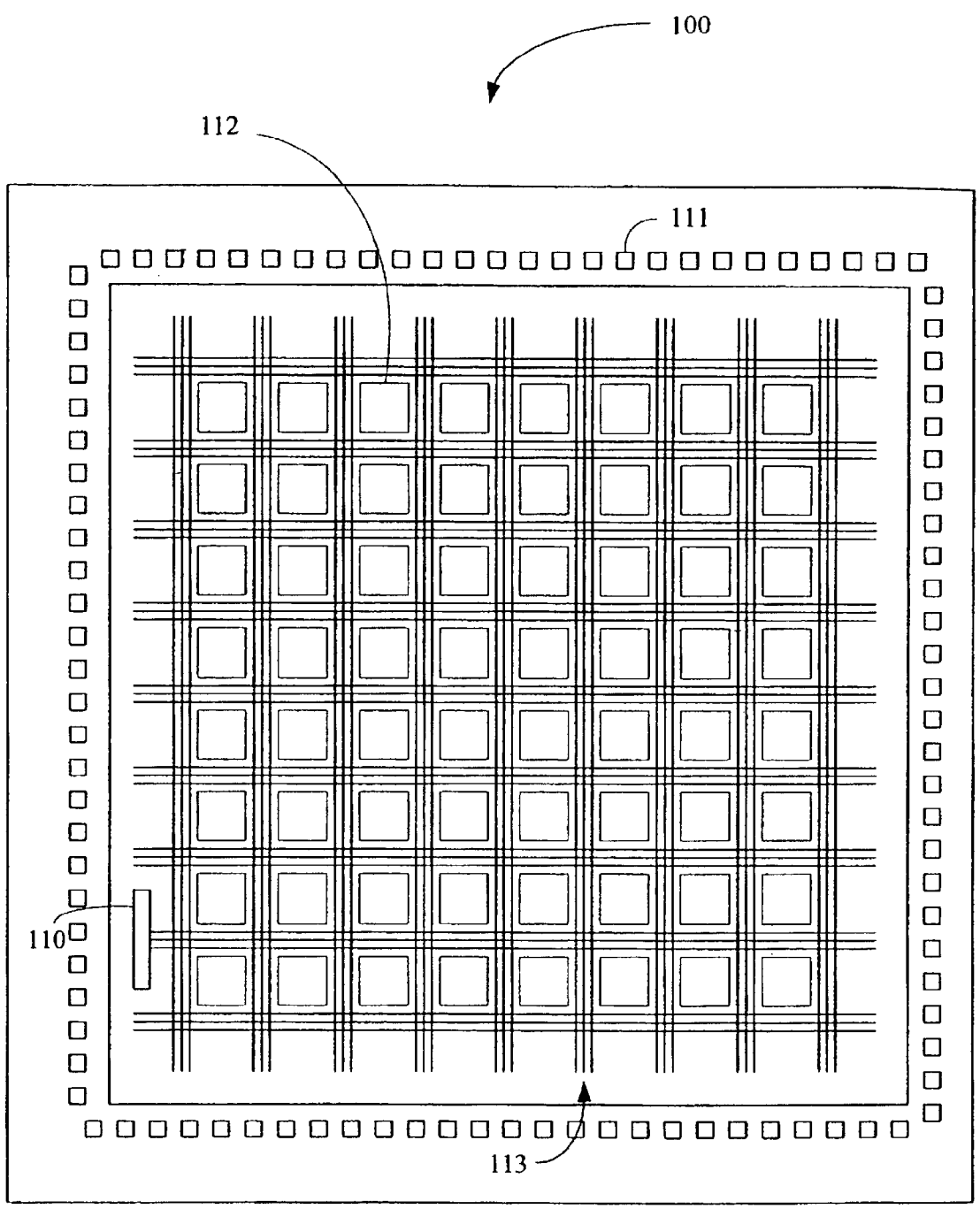
FIG. 1 is a simplified block diagram of a programmable logic device including the permission memory of the present invention.

The present invention ensures that reproducible cores for PLDs can only be copied to a pre-determined number of devices by an authorized user. FIG. 1 illustrates one type of PLD, an FPGA 100, which includes a plurality of input/output blocks (IOBs) 111 for providing the interface between the package pins and the internal signal lines, a plurality of configurable logic blocks (CLBs) 112 for constructing the customer's logic, and a programmable interconnect 113 for interconnecting the input and output terminals of these blocks. IOBs 111, CLBs 112, and programmable interconnect 113 are customized by programming internal memory cells (not shown) using a software-generated, configuration bitstream. The values stored in these internal memory cells determine the logic function(s) implemented by FPGA 100.

In accordance with the present invention, FPGA 100 includes a non-volatile permission memory 110. Permission memory 110 may be as large as one kilobyte to allow the manufacturer and core supplier a variety of choices when assigning a permission bit code to a core or as small as a single bit.

Figure 2:
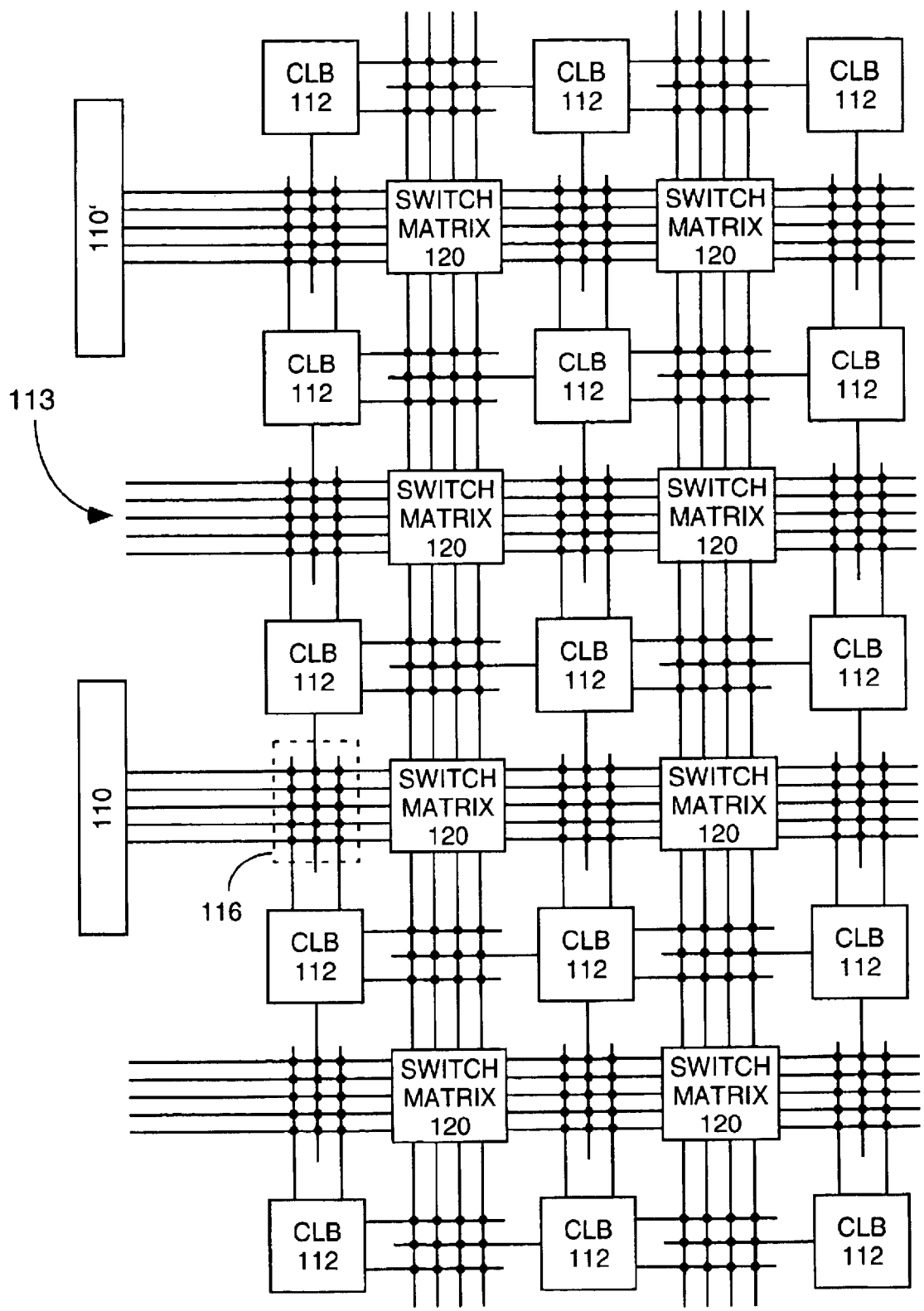
FIG. 2 illustrates the interconnection of the permission memory to other elements of a programmable logic device.

FIG. 2 provides a more detailed view of the interconnection of permission memory 110, CLBs 112, and programmable interconnect 113. A plurality, of switch matrices 120 selectively connect the horizontal and vertical lines of programmable interconnect 113, thereby allowing full connectivity between any two elements on the device. Like CLBs 112, permission memory block 110 is connected to a plurality of programmable interconnect points 116 which, in turn, are connected to switch matrices 120. Thus, permission memory block 110 is connectable to any other element on FPGA 100.

In accordance with the present invention, permission memory block 110 is preferably implemented with antifuse or other one-time programmable memory cells, thereby ensuring the customer cannot reprogram permission memory block 110. However in other embodiments, such as those including encryption (described in detail below), permission memory block 110 is implemented with any standard non-volatile memory cells.

If permission memory block 110 includes only a single bit, then the programmed/non-programmed status of that bit grants or denies permission. Alternatively, a bit pattern may identify a group of cores, so that a single permission code may allow a customer access to all cores from the group. The core group may be defined, for example, by a common function (e.g., the "DSP core set" or "the microprocessor core set") or by members that share the same per-copy cost (e.g., the "$500/copy core set"). Thus, a distinct advantage of the present invention is that the exact use of the core permission code may be determined at the discretion of the core supplier.

Figure 3:
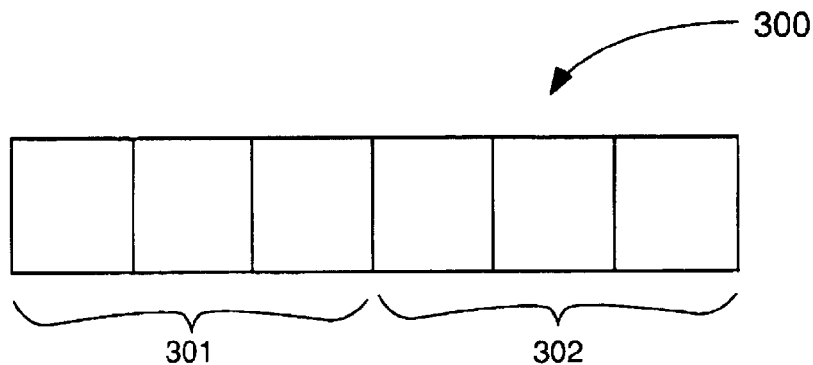
FIG. 3 shows a permission bit field as might be utilized in the present invention.

The code programmed into permission memory block 110 may also be a bit pattern that identifies a core supplier and/or a specific core provided by that supplier. FIG. 3 illustrates one example of a permission bit field 300 having a supplier identifying field 301 and a core identifying field 302. In one embodiment, fields 301 and 302 are programmed separately, with field 301 programmed by a device manufacturer and field 302 programmed by the supplier. Of course, the supplier could inform the manufacturer of the selected code and request the manufacturer check for overlap with other suppliers— codes, but this is not required.

All variations on the selected code, its significance, and the programming party are considered within the scope of the present invention. Indeed, the core supplier could program the core permission memory at its own facility, thereby avoiding entirely the need to release a permission code to any party, including the manufacturer. A stand-alone unit could be used to program the permission bits in a manner understood by those skilled in the art. Or, a configuration proprietary to the supplier and/or the manufacturer could be temporarily programmed into the PLD itself, thereby enabling the supplier or manufacturer to input a desired permission bit setting and irreversibly program the permission bits in the manner explained above. Thereafter, the device could be reconfigured with the core enabled by the proper permission memory setting.

Figure 4:
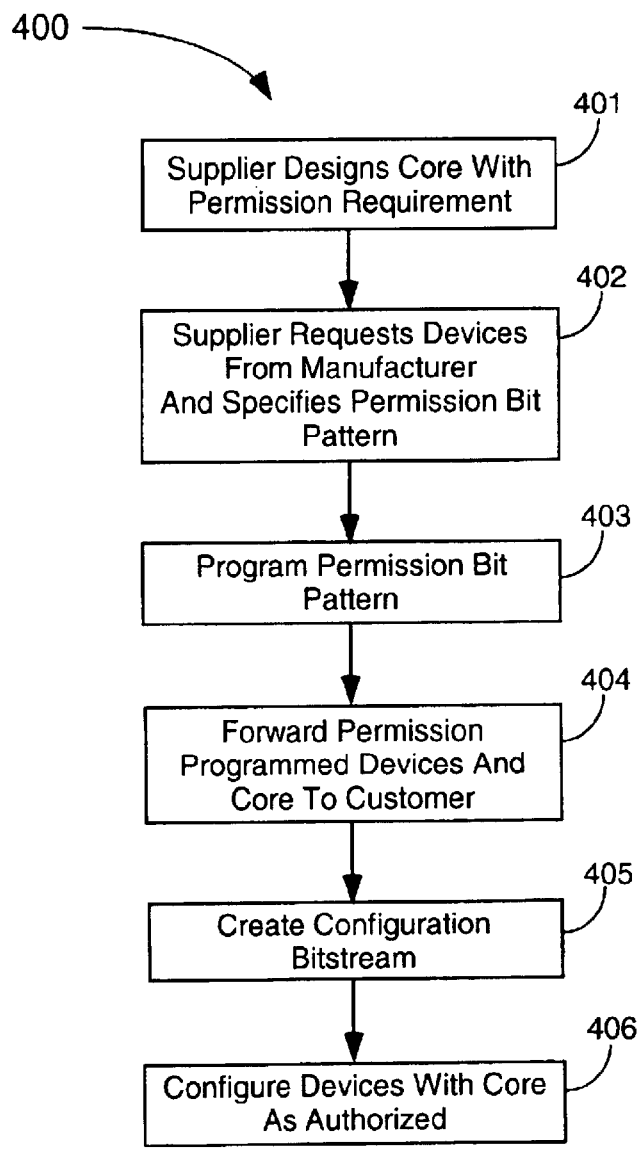
FIG. 4 illustrates one method of practicing the present invention.

FIG. 4 illustrates a method 400 of using the present invention. At step 401, a core supplier designs a core. Included in the core is a mandatory permission bit checking function, which seeks a particular bit pattern, such as 011010, where each "0" represents an unprogrammed bit and each "1" represents an irreversibly programmed bit in a non-volatile permission bit memory section of the PLD. At step 402, a manufacturer receives an order from the supplier specifying the quantity of a particular device or set of devices to be programmed with the supplier's specified bit pattern. Step 402 may precede step 401 if the core supplier would prefer to have a particular target device in mind for implementation of its core. Next, at step 403, the manufacturer programs the requested number of devices with the determined permission setting or, alternatively, enables the supplier to discharge this duty. At step 404, the customer then receives the permission-programmed devices and a software file including a representation of the core. At step 405, a configuration bitstream is created for implementing the core in the device. Alternatively, the bitstream could be created by the supplier and shipped to the user. At step 406, once the required bitstream is generated, at least in part from the core file, the customer configures the device.

In accordance with the present invention, the manner in which the core interacts with the permission memory is up to the supplier's discretion. In one embodiment, the core confirms the permission bits are properly configured, an then functions. independent of the permission memory block. In another embodiment, the core confirms at designated intervals that the permission memory is properly configured. Confirming proper configuration at designated intervals, such as every time data is placed on a data bus, advantageously render's reverse engineering virtually impossible In one embodiment of the present invention, the core is built to interrogate permission memory block 110 with a predetermined pattern. Specifically, the core sends a request to permission memory block 110 which, in addition to permission bit field 300 (FIG. 3), includes logic to provide more complex functionality. For example, permission memory block 110 may include multiple permission bit fields 300. The logic in permission memory block 110 selectively activates one or more cores based on the request and the multiple permission bit fields. In another example, the logic in conjunction with an external, real-time clock may determine if the core has an associated expiration date and, if so, whether such date has passed.

In accordance with the present invention, an encryption scheme can be utilized when configuring the PLD with the core. An encryption scheme, such as public key encryption, allows a supplier to encrypt a bitstream with a known key, but still prevents reverse engineering because knowledge of the key used for the encryption does not enable a pirate to decrypt. For a detailed illustration of one encryption scheme implemented in a PLD, see U.S. patent application Ser. No. 09/038,800 to Kelem, et al., entitled "SYSTEM AND METHOD FOR PLD BITSTREAM ENCRYPTION", filed Mar. 11, 1998, which is incorporated herein by reference.

provide the encyption/decryption function, the PLD may include both bitstream decryption circuitry (such as that described in U.S. patent application Ser. No. 09/038,800) and core permission circuitry. In this embodiment, an encrypted configuration bitstream for implementing a core is decrypted as it is loaded into the device. However, the core performs its intended function only if the proper permission bits are provided. The core includes permission checking circuitry that ensures the proper permission bits are provided. The permission bits are set as described in reference to FIG. 4.

Figure 5A:
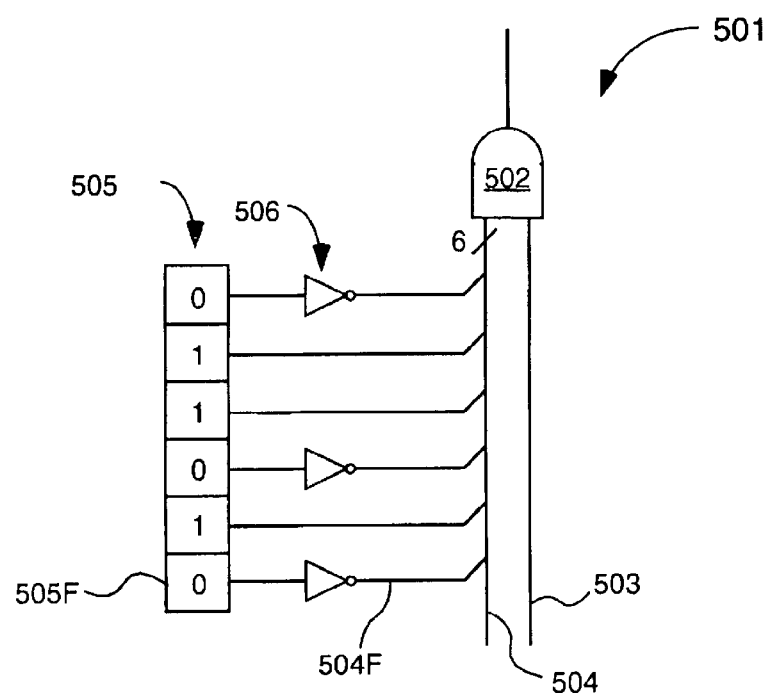
FIGS. 5A and 5B illustrate two embodiments of permission checking circuitry.
Figure 5B:
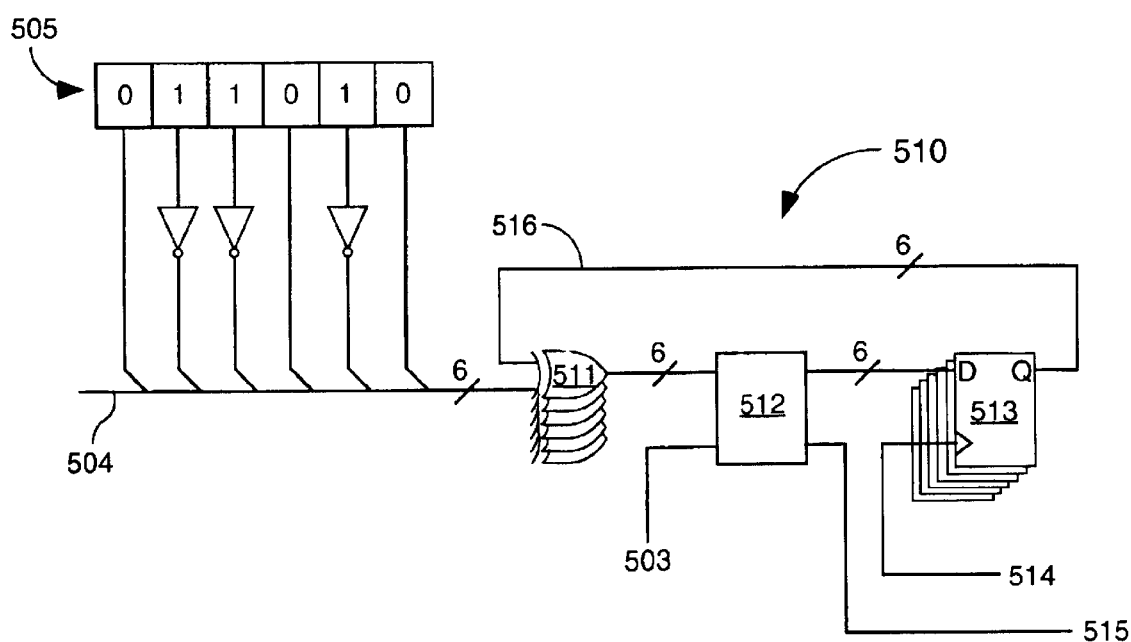

FIGS. 5A and 5B illustrate two implementations of such permission checking circuitry. Circuitry 51 of FIG. 5A includes a logic gate 502, in this embodiment an AND gate, which receives a design data signal on line 503. Each permission bit 505 is provided to a designated line of bus 504. For example, bit 505F is provided to line 504F. As shown in FIG. 5A, logic gate 502 receives each permission bit on bus 504.

Assuming an AND gate implements logic gate 502, all permission bits (six bits shown for illustration purposes) from bus 504 must be logic one to correctly pass result data from the core on line 503 The user's design includes inverters 506 to invert the logic zero bits, thereby checking the permission bits. In this embodiment, if an incorrect set of permission bits is provided, at least one logic zero is provided on bus 504, thereby ensuring that logic gate 502 continuously outputs a logic zero irrespective of the signals on line 503. In this manner, the core will not function properly. In one embodiment, gate 502 is replicated for every line in an output data bus, wherein line 503 is one line in such a bus. Thus, in this embodiment, the core could still implement a proper communication protocol, for example, yet not output correct data.

FIG. 5B illustrates a block diagram of a finite state machine implementing permission checking circuitry 510. Circuitry 510 includes a plurality of flip-flops 513 all driven by the same clock on line 514. A Next State Logic (NSL) circuit 512 computes new values for each of the D inputs of flip-flops 513 based on the outputs of a plurality of exclusive OR (XOR) gates 511 (in this embodiment six XOR gates 511 are provided, one gate for each pair of lines formed from buses 504 and 516). In accordance with the present invention, NSL circuit 512 also receives additional logic inputs 503 and generates logic outputs 515.

In circuitry 510, the logic one bits off permission bits 505 are inverted. Thus, if proper permission bits are received, then bus 504 provides all logic zero signals to XOR gates 511 and XOR gates 511 pass the feedback signals provided by flip-flops 513. Specifically, XOR gates 511 will output logic ones if all feedback signals are logic ones. If improper permission bits are received, then some bits of flip-flops 513 will be inverted. As a result, NSL circuit 512 will not function correctly. Permission checking circuitry 510 is extremely difficult to reverse engineer and therefore offers significant advantages to the core supplier.

Note that circuitry 510 may be used in a PLD in which a standard (i.e. non-encrypted) bitstream is loaded. In such a device, the bitstream decryption circuitry is not necessary.

In one embodiment of the present invention, the permission bits are programmed into the PLD the same time as the customer's configuration bitstream. In this embodiment, the permission bit sequence for a plurality of cores may be included with software for creating the configuration bitstream, or may be downloaded from a secure location across the Internet or a similar computer network once authorization is appropriately checked. The software then includes the permission bits in the configuration bitstream as, for example, a bitstream header. During configuration, the PLD forwards the permission header to permission memory block 110 and the remainder of the bitstream configures the PLD with a circuit including the proprietary core. Therefore, this embodiment ensures control over authorization to copy, but not control over the number of copies implemented.

In still another embodiment, a plurality of permission memory sub-blocks or separate permission memory blocks may be provided and programmed with distinct core authorization keys, wherein a core can be designed to check for a match of any one of the keys. In this manner, a single device could be used by a plurality of suppliers, a plurality of different core customers, or by a customer for a plurality of cores.

In summary, a system and method have been described for enabling only authorized users to implement a proprietary core. Although the present invention has been shown and described with respect to several embodiments, various changes and modifications would be apparent to those skilled in the art. Therefore, the present invention is defined only by the appended claims.

What is claimed is:

1. An apparatus enabling secure distribution of a core, the core having a predetermined function, the apparatus comprising:
    a programmable logic device including al permission memory block, wherein the core, when implemented on the programmable logic device, will perform the predetermined function only if the permission memory block is programmed with an appropriate code.

2. The apparatus of claim 1 wherein the permission memory block is one-time programmable.

3. The apparatus of claim 1 wherein the permission memory block comprises non-volatile memory.

4. The apparatus of claim 1 wherein the permission memory block comprises an antifuse memory.

5. The apparatus of claim 1 wherein the code indicates at least one of the supplier, cost, number of authorized copies, and the predetermined function.

6. The apparatus of claim 1 further comprising permission checking circuitry.

7. A method of limiting the distribution of a core to an authorized user, the core having an intended function and being suitable for implementation on a programmable logic device including a core configuration memory portion in electrical communication with a permission memory portion, the method comprising:
    a) programming the permission memory portion with a core permission sequence; and
    b) configuring the configuration memory portion with the core, wherein the core will perform the intended function only if the code permission sequence programmed into the permission memory portion is a proper core permission sequence.

8. The method of claim 7 wherein the programming step is performed by a first party and the configuring step is performed by a second party.

9. The method of claim 8, wherein the first party is a programmable logic device manufacturer.

10. The method of claim 7 wherein at least one of the permission memory portion and the configuration memory portion is one-time programmable.

11. The method of claim 7 wherein the configuration memory portion is reprogrammable.

12. The method of claim 7 wherein the permission memory portion includes a non-volatile memory.

13. The method of claim 7 wherein the permission memory portion includes an antifuse memory.

14. The method of claim 7 wherein the core authorization sequence indicates at least one of the supplier, cost, number of authorized copies, and the intended function.

15. The method of claim 7 wherein the core is encrypted and further comprising c) decrypting the core as it is loaded into the programmable logic device.

16. The method of claim 7 wherein the intended function includes generating correct output data.

17. A method of programming a programmable logic device (PLD) with a core having an intended function, the PLD including bitstream decryption circuitry and permission checking circuitry, the method comprising:
   loading permission bits into the permission checking circuitry;
   loading an encrypted configuration bitstream into the bitstream decryption circuitry;
   decrypting the encrypted configuration bitstream; and
   configuring the PLD with the decrypted bitstream, wherein the core performs its intended function only if proper permission bits are loaded into the permission checking circuitry.

18. An apparatus enabling secure distribution of a core, the core having an intended function, the apparatus comprising:
   a programmable logic device including a core configuration memory portion in operative relation to a plurality of permission memory portions, wherein the core, when implemented in the core configuration portion, will perform the intended function only if at least one of the plurality of permission memory portions is programmed with a core permission sequence.

* * * * *